United States Patent [19]

Hoppal et al.

[11] Patent Number: 5,737,331

[45] Date of Patent: Apr. 7, 1998

[54] METHOD AND APPARATUS FOR CONVEYING AUDIO SIGNALS USING DIGITAL PACKETS

[75] Inventors: Thomas Jake Hoppal, Gilbert; Peter Joseph Armbruster, Tempe; James William Bishop, Jr., Chandler; Johanna Wild, Scottsdale, all of Ariz.

[73] Assignee: Motorola, Inc., Schaumburg, Ill.

[21] Appl. No.: 529,812

[22] Filed: Sep. 18, 1995

[51] Int. Cl.[6] .................. H04J 3/12; H04M 3/42
[52] U.S. Cl. .................. 370/349; 370/410; 370/435; 370/477; 370/522; 379/283; 395/2.75; 455/563
[58] Field of Search .................. 370/259, 349, 370/357, 359, 360, 384, 389, 395, 400, 410, 433, 434, 435, 465, 467, 477, 522, 525, 526, 242, 244; 371/37.1, 37.7; 379/88, 93, 94, 97, 98, 201, 229, 269, 280, 282, 283, 360, 361; 395/209, 2.21, 2.67, 2.75, 2.79; 455/403, 412, 413, 414, 427, 428, 445, 450, 550, 563

[56] References Cited

U.S. PATENT DOCUMENTS

| | | |
|---|---|---|
| 4,110,560 | 8/1978 | Leary et al. .................. 370/296 |
| 4,133,979 | 1/1979 | Helliwell et al. .................. 370/526 |
| 4,747,096 | 5/1988 | Piasecki et al. .................. 370/435 |
| 4,750,173 | 6/1988 | Bluthgen .................. 370/477 |
| 4,782,485 | 11/1988 | Gollub .................. 370/477 |
| 4,860,313 | 8/1989 | Shpiro .................. 375/245 |
| 5,018,136 | 5/1991 | Gollub .................. 370/477 |
| 5,072,442 | 12/1991 | Todd .................. 370/265 |
| 5,140,627 | 8/1992 | Dahlin .................. 379/60 |
| 5,497,373 | 3/1996 | Hulen et al. .................. 370/359 |

Primary Examiner—Alpus H. Hsu
Attorney, Agent, or Firm—Gregory J. Gorrie

[57] ABSTRACT

A digital telecommunication network (10) provides an audio processor (56) for each call in each external node (14). The audio processor (56) includes a vocoder and additional functions. At a source external node (14), the audio processor (56) detects DTMF events and encodes the events in a call-related signalling packet (26) which conveys a history of all DTMF activity at the source node over the past several seconds. In addition, the source node detects silence and configures a call-related signalling packet (26) to instruct a destination node (14) how to synthesize comfort noise. Speech is encoded as vocoded voice packets rather than call-related signalling packets. At a destination external node, the node's audio processor (56) distinguishes call-related signalling from vocoded voice. The audio processor (56) synthesizes voice, comfort noise, DTMF signals, and other signals in response to the call-related signalling packets and vocoded voice packets.

25 Claims, 6 Drawing Sheets

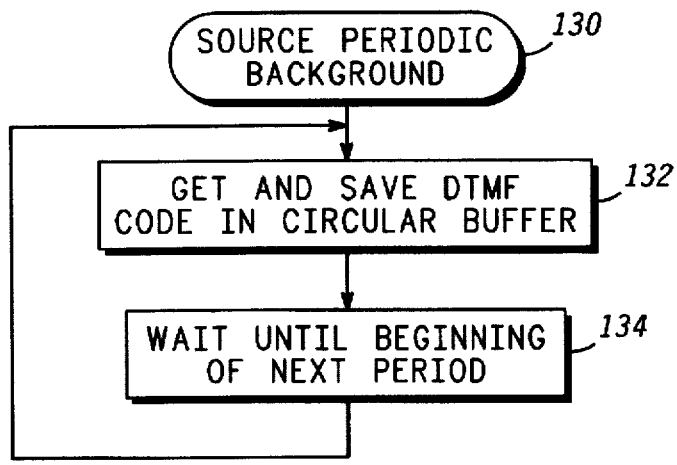
FIG. 9
FIG. 10
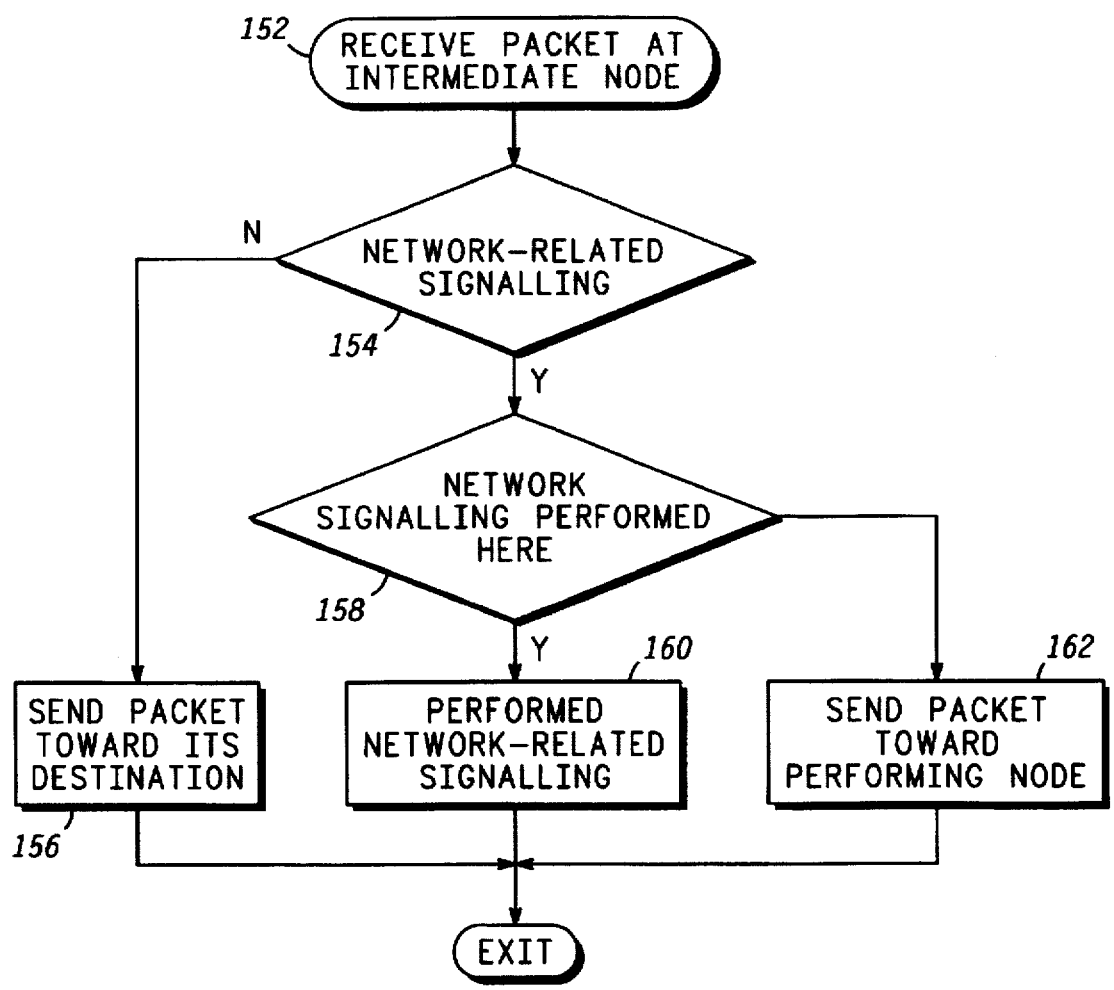

5,737,331

METHOD AND APPARATUS FOR CONVEYING AUDIO SIGNALS USING DIGITAL PACKETS

FIELD OF THE INVENTION

The present invention relates generally to digital telecommunications.

BACKGROUND OF THE INVENTION

Human speech represents a large portion of the user information transported by a telecommunication network between sources of user information and destinations for the user information. Digital telecommunications often employ the use of vocoders to analyze the human speech at a source node using sophisticated modeling techniques which reflect human speech capabilities. Speech synthesis control data result from this analysis. These control data are transported as user information to an intermediate or destination node where a speech synthesizer reconstructs the speech analyzed at the source node.

Increasingly sophisticated speech analysis techniques have allowed acceptable quality digitized speech to be transported through lower bandwidth channels. This is a highly desirable development, particularly for telecommunication networks which employ RF communication links between nodes, because it permits the telecommunication networks to transport more human speech in the form of calls over a given set of network resources. However, an undesirable consequence of this development is that non-speech information is often handled inefficiently and with great difficulty.

Dual tone multi frequency (DTMF) signals represent one area of non-speech information which is handled inefficiently in conventional digital communication networks. As vocoders have become better able to analyze and synthesize human speech patterns, they have become less able to analyze and synthesize audio sounds which are incompatible with human speech, such as DTMF signals. Consequently, DTMF signals do not accurately pass through low bandwidth compatible vocoders.

To solve this problem, one conventional digital telecommunication network has transported DTMF information through digital channels using out-of-band signalling. Unfortunately, the out-of-band signalling is processed by a common network control facility which simultaneously handles out-of-band signalling for a vast number of calls. Out-of-band signalling messages are placed in a message queue where they are processed when the control facility can get to them. An unfortunate consequence of this technique is that the relative timing of DTMF signals is seriously delayed and often seriously distorted. This is highly undesirable because many types of accessory telecommunication equipment, such as answering machines and the like, are remotely controlled by receiving sequences of DTMF tones which have particular timing associated therewith. Moreover, this technique is used only for a single digital link within a connection and not for an entire connection. Hence, out-of-band DTMF signalling feature impose significant limitations for DTMF signals, especially when no out-of-band channel is available outside the single digital link.

Comfort noise represents another area of non-speech information which is conveyed inefficiently in conventional digital communication networks. Normal speech is characterized by a significant amount of silence at either end of a connection. The silence occurs during pauses in a conversation and while one party is listening as the other party is talking. Digital packet switched telecommunication networks can achieve efficiencies over analog networks by refraining from transmitting packets that essentially convey silence. However, absolute silence is uncomfortable at a receiving end. The listening ear, after hearing silence, is not ready to hear human speech which is accompanied by a certain amount of background noise. Comfort noise may be synthesized at the receiving end in response to very little control data received from the transmitting end to simulate the background noise conditions at the transmitting end.

Conventional digital telecommunication networks convey comfort noise information using in-band signalling. In one form of in-band signalling, in-band control bits are used to distinguish in-band signalling from digitized speech. This is an undesirable solution that inefficiently uses available speech bits for the purpose of in-band control. Comfort noise information is transported very seldom. Consequently, the control bits almost always inform the receiving node that the packet contains digitized speech. Due to the use of the control bits as control bits, the digitized speech is described less accurately than it would be if the control bits were used to help convey digitized speech instead.

In another form of in-band signalling, all in-band bits are interpreted as speech synthesis control data, but an illegal combination of speech synthesis control data is detected as an exception and interpreted as an instruction to generate comfort noise. This is an undesirable solution that can lead to the unreliable generation of comfort noise, particularly in cellular telecommunication networks, espceially telecommunication networks with low vocoder rates. In cellular and other networks, poor signal conditions which lead to sporadic data errors are often encountered. Unreliable operation can result because a combination of many bits must be correctly received before the comfort noise instruction is identified, and these bits are typically covered only lightly with error detection and correction bits. Consequently, the receiving vocoder often fails to detect the comfort noise instruction during high bit error conditions.

SUMMARY OF THE INVENTION

The present invention provides a method and apparatus for digitally conveying audio signals through a telecommunication network using digital packets. A first portion of a packet is evaluated to detect a call-related signaling event. The call-related signaling event is synthesized when the call-related signaling event is detected. The call-related signaling synthesis occurs in response to data conveyed by a second portion of said packet. Speech synthesis is performed at an audio processor when the call-related signaling is not detected. The speech synthesis occurs in response to data conveyed by the second portion of the packet.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 9 shows a flow chart of DTMF signalling and background processes; and

FIG. 10 shows a flow chart of a receive packet at an intermediate node process.

DETAILED DESCRIPTION OF THE DRAWINGS

Figure 1:
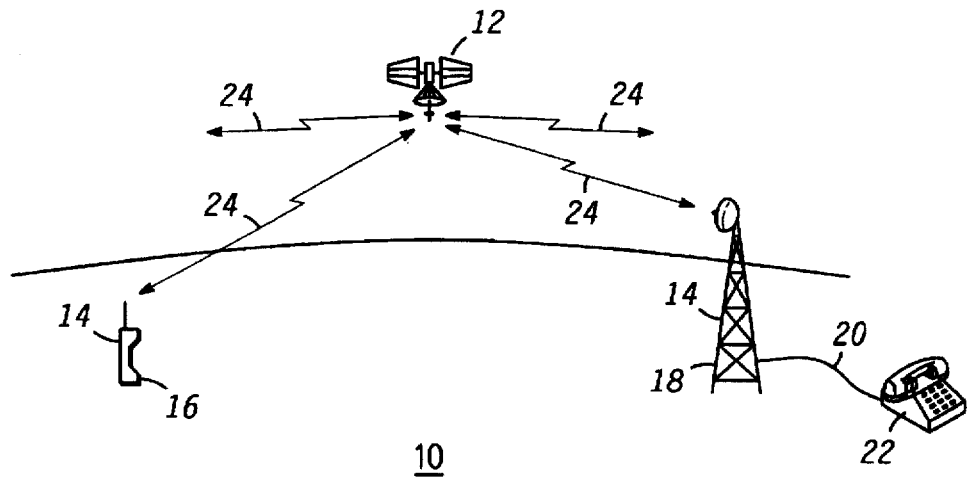
FIG. 1 shows a layout diagram of an environment within which a telecommunication network may operate.

FIG. 1 shows a layout diagram of an environment within which a telecommunication network 10 operates. Network 10 includes an earth-orbiting satellite 12 and other intermediate nodes (not shown) through which communications are transported en route to and from external nodes 14 of network 10. While a preferred embodiment of the present invention configures certain intermediate nodes 12 as satellites, this is not a requirement. Many or all network nodes may be located on or near the surface of the earth. In addition, while FIG. 1 shows the use of a single intermediate node 12 between external nodes 14, communications may be routed through as many intermediate nodes 12 as may be required for two or more given external nodes 14.

External nodes 14 include user units 16, which are controlled by users of the telecommunication services provided by network 10. External nodes 14 also include network units 18, which may interface with other communication networks, such as a public switched telecommunication network (PSTN) 20. While network units 18 serve as external nodes 14 for network 10, communications need not be delivered to a user at a network unit 18 but may be delivered to a user through PSTN 20 at conventional telephonic equipment 22. PSTN 20 may be an analog communication network.

Network 10 is a digital network. User information is transported between external nodes 14 by the use of digital data packets (discussed below). A stream of such packets between external nodes 14 forms a communication channel which is capable of conveying audio information. While such a channel is capable of conveying audio information, nothing prevents it from alternatively conveying raw user data that has no relationship to audio information. Audio information includes digitized forms of audio signals. Such audio signals include voice, comfort noise, dual tone multi frequency (DTMF), call progress tones, and the like. Such signals are often referred to as in-band signals. In accordance with a preferred embodiment of the present invention, external nodes 14 include an audio processor (discussed below) for each channel that can be handled simultaneously.

While not a requirement of the present invention, various communication links 24 between nodes 12 and 14 may be RF communication links. RF communication links use the scarce commodity of the electromagnetic spectrum which is desirably conserved as much as possible. Hence, audio information is characterized using as little data as practical to transport adequate quality audio signals. In addition, link quality, particularly for links 24 which terminate at user units 16, may vary widely in the course of normal use. Consequently, during times of poor quality bit errors are to be expected at the receiving end of a call.

Figure 2:
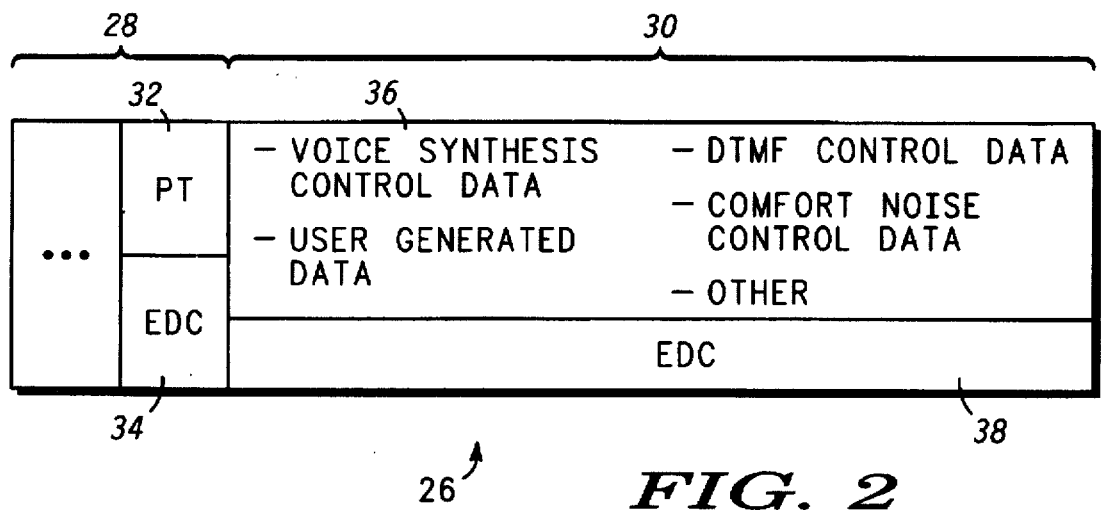
FIG. 2 shows a data format diagram of a packet transported by the digital telecommunication network.

FIG. 2 shows a data format diagram of a packet 26 transported by network 10. Packet 26 includes a header portion 28 and a payload portion 30. Header 28 conveys out-of-band control information. Information conveyed by header 28 is not of particular interest to users and is not presented to users. Unless packet 26 conveys network-related signalling information, payload 30 conveys digitized in-band signals which are important to users and are presented to users, often after translation into an analog form.

Header 28 conveys communication data which includes a packet type (PT) 32 among other items. The other items may, for example, include an address of the source and destination nodes for packet 26. In the preferred embodiment, packet type 32 includes only a few bits which characterize packet 26. Packet type 32 desirably indicates whether packet 26 is a data packet, a voice packet, a call-related signalling packet, a network-related signalling packet, or the like. The use of only a few bits in packet type 32 leads to a robust communication scheme because the likelihood of a bit error occurring in a few bits is less than the likelihood of a bit error occurring in a greater number of bits. Since a bit error can lead to a mischaracterization of packet type, the use of only a few bits in packet type 32 produces a low likelihood of mischaracterizing the packet type.

Moreover, packet type 32 and possibly other items in header 28 are covered with error detection and control (EDC) bits 34. In the preferred embodiment, the ratio of EDC bits to communication data in header 28 is relatively high. In other words, the number of bit errors occurring in header 28 which can be detected and corrected is relatively high. In comparison, communication data 36 in payload 30 are covered with EDC bits 38. However, the ratio of EDC bits to communication data in payload 30 is relatively low, and the number of bit errors which can be detected and corrected in payload 30 is relatively low. A lower EDC ratio is tolerated in payload 30 because it leaves more bits for characterizing in-band signals, such as digitized voice, so that the in-band signals may be transported at a better quality level.

Thus, a robust scheme is provided for communicating packet type 32 without sporadic bit errors. The chances of mischaracterizing packet type 32 are extremely low. A less robust scheme is provided for communicating payload 30 without sporadic bit errors, but as a consequence payload 30 has more bits available for better quality in-band signal characterization.

In general, signalling refers to controlling information that is communicated between nodes in network 10 rather than information which is being communicated between users. Network-related signalling refers to signalling which controls the allocation or de-allocation of network resources in order to form a connection which will support a call. Consequently, network-related signalling is of great importance to the providers of network 10 and of less importance to users. Examples of network-related signalling include packets conveying messages directed to call setup, hand-off, third party calling, call tear down, and the like.

In contrast to network-related signalling, call-related signalling need not lead to the allocation or de-allocation of network resources. Consequently, it is typically of less importance to network providers but of great importance to users. Examples of call-related signalling include packets conveying messages or instructions directing destination nodes to generate or synthesize DTMF signals, comfort noise, and other non-voice related audio signals. DTMF signals may be employed by users to control auxiliary equipment and comfort noise may be employed by users or user equipment to provide background noise for a voice conversation.

Figure 3:
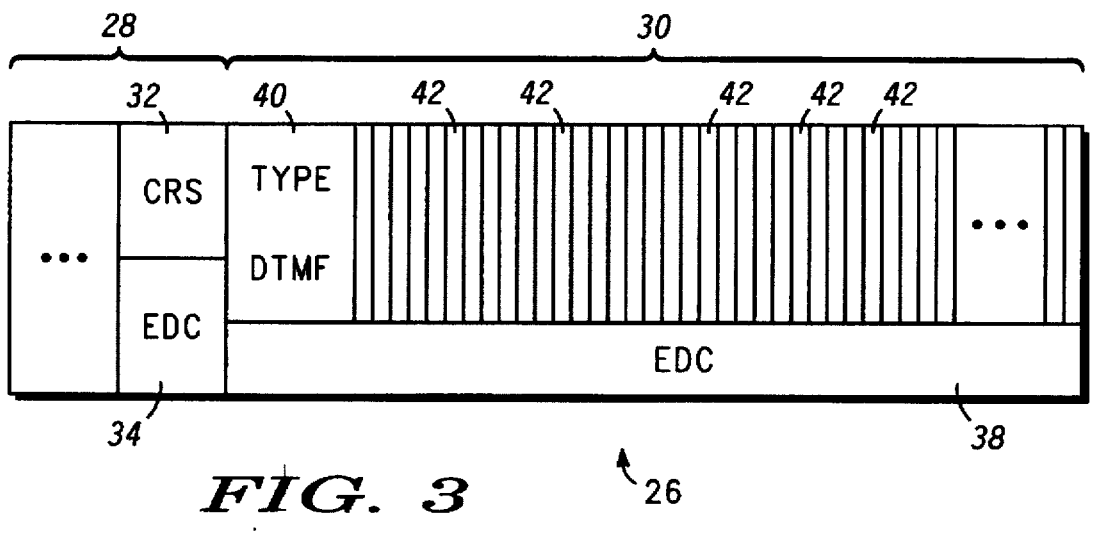
FIG. 3 shows a data format diagram of a DTMF signalling packet transported by the network.

FIG. 3 shows a data format diagram of a DTMF signalling packet transported by network 10. Packet 26 has its packet type 32 set to indicate call-related signalling (CRS). Those skilled in the art will appreciate that CRS signalling represents only one code out of all possible codes expressible by the bits included in packet type 32. For example, if packet type 32 includes three bits, then eight codes may be expressed and CRS signalling is identified in packet type 32 at a cost of only ⅜ of a bit from header 28.

Payload 30 includes a type field 40 which has been set to indicate a DTMF type of call-related signalling. If a different type of call-related signalling, such as comfort noise, were being conveyed, then type field 40 would be set to a different code. Payload 30 also includes any number of DTMF synthesis instructions 42. Each instruction commands a destination node to generate either silence or a specified DTMF analog signal. In addition, timing data are conveyed so that the destination node can determine how long to continue the DTMF signal or silence. Furthermore, historical or sequencing data are conveyed so that the destination node can determine all DTMF instructions issued during a call over a previous period of time, such as ten seconds. The historical data improve reliability in communicating DTMF signals during a call. If DTMF packets 26 are lost or corrupted, subsequent DTMF packets 26 will make up for the lost or corrupted data.

In a preferred embodiment of the present invention, each DTMF instruction 42 is associated with a particular sequence, a particular DTMF activity, and a predetermined duration, for example 180 ms. Thus, fifty to sixty of such instructions 42 define the DTMF signalling history from the present into the past for a period of approximately ten seconds.

Figure 4:
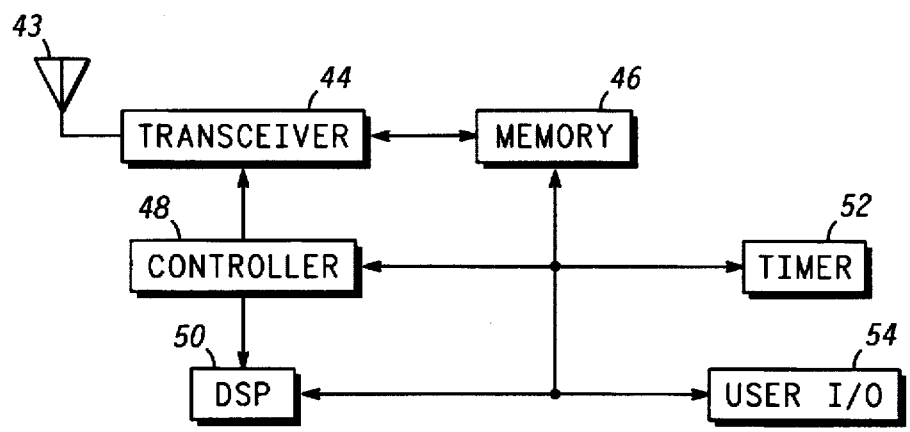
FIG. 4 shows a simplified block diagram of hardware included at various nodes of the network.

FIG. 4 shows a simplified block diagram of hardware included at external nodes 14 (see FIG. 1) of network 10. An antenna 43 or other interface to a communication link 24 (see FIG. 1) couples to a transceiver 44. Transceiver 44 couples to a memory 46 and a controller 48. Controller 48 couples to memory 46 and to a digital signal processor (DSP) 50, a timer 52, and a user I/O section 54. If an external node 14 can simultaneously handle multiple calls, then this hardware may be time multiplexed and/or duplicated as needed to handle each call.

Controller 48 and DSP 50 together execute programming instructions stored in memory 46 to carry out processes discussed below so that node 14 can originate packets 26 and serve as a destination for packets 26. These processes implement, among other things, the above-discussed audio processor. User I/O section 54 includes a microphone, speaker, display, keypad, and/or interface to PSTN 20 (see FIG. 1). Timer 52 keeps track of the passage of time to aid controller 48 and DSP 50 in performing time-related functions.

When packets 26 are received, they are initially stored in memory 46 for subsequent processing. Unless the packets convey network-related signalling, they are processed in controller 48 and DSP 50 and translated into an appropriate form for presentation to a user through user I/O section 54. This translation includes synthesis of voice, DTMF, comfort noise, and other audio signals. When user i/O section 54 provides user information to controller 48 and DSP 50, such user information is analyzed and encoded for placement in a packet 26. The packet 26 is initially formed in memory 46, then sent away from node 14 through network 10 toward its destination.

Intermediate nodes 12 (see FIG. 1) may have a structure similar to that described in FIG. 4, except that DSP 50 and user I/O section 54 may be omitted. When an intermediate node 12 receives a packet 26, it relays the packet 26 onto the destination for the packet. When a packet 26 conveys network-related signalling, the intermediate node may be the destination node. In this situation the intermediate node performs the network signalling function to which the packet is directed.

Figure 5:
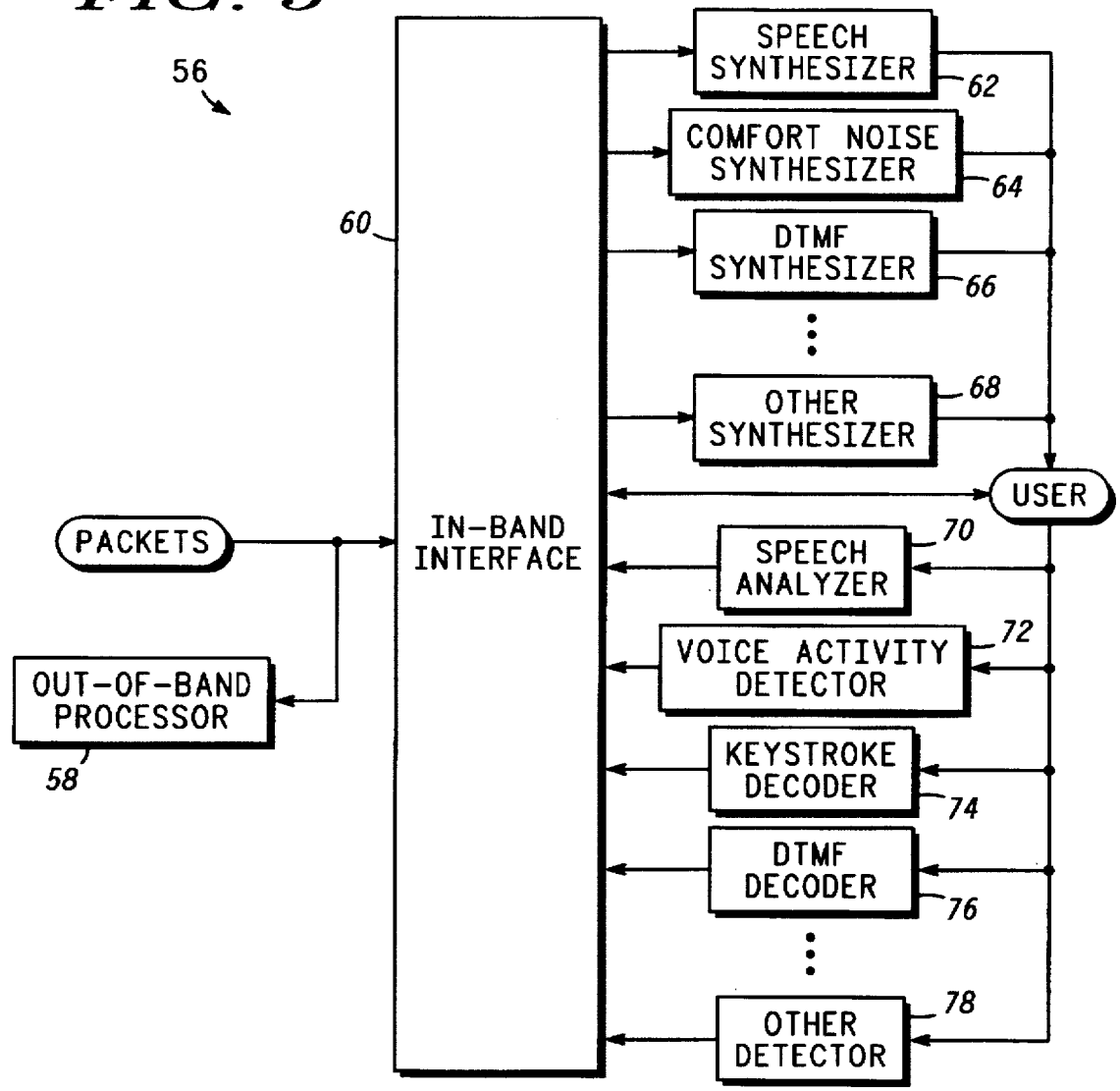
FIG. 5 shows a block diagram of an audio processor implemented at various nodes of the network.

FIG. 5 shows a block diagram of an audio processor 56 implemented at each external node 14 of network 10 for each call handled by the node 14. Received packets 26 that convey network-related signalling are passed to an out-of-band processor 58 for actions related to call setup, call handoff, third party calls, call tear down, and the like. Other received packets 26 are evaluated by an in-band interface 60. Based upon packet type, in-band interface 60 activates a speech synthesizer 62, a comfort noise synthesizer 64, a DTMF synthesizer 66, or other synthesizer 68 to translate the data conveyed by payload 30 (see FIGS. 2-3) into audio signals which are presented to a user through user I/O section 54 (see FIG. 4). Raw user data may be passed directly to a user from in-band interface 60.

When activity at user I/O section 54 (see FIG. 4) provides user information to be communicated to a destination node, an appropriate analyzer or detector encodes the information into a form compatible with packets 26. The analyzers and detectors include a speech analyzer 70, a voice activity detector 72, a keystroke detector 74, a DTMF decoder 76, and other detectors 78. Keystroke detector 74 may be used at user unit 16 (see FIG. 1) to detect user-manipulated keys, and DTMF decoder 76 may be used at network unit 18 (see FIG. 1) to decode and identify the occurrence of audio DTMF tones received from PSTN 20 (see FIG. 1). After encoding, in-band interface 60 forms packets 26 and causes the packets to be sent toward their destination through network 10. Raw user data may be passed directly from a user to in-band interface 60.

Those skilled in the art will appreciate that speech synthesizer 62 and speech analyzer 70 together form a vocoder. Thus, audio processor 56 includes a vocoder along with additional audio processing functions. Audio processor 56 is a module which may be easily and inexpensively implemented at any external node 14 for network 10. Since audio processor 56 resides at external nodes 14, the functions provided by audio processor 56 are bi-directional. In addition, since an audio processor 56 is provided for each end of each call, the in-band signals processed thereby are acted upon quickly. In-band signals experience neither significant delay nor timing distortion otherwise caused by queuing commands in a centralized facility that supports any number of calls.

Figure 6:
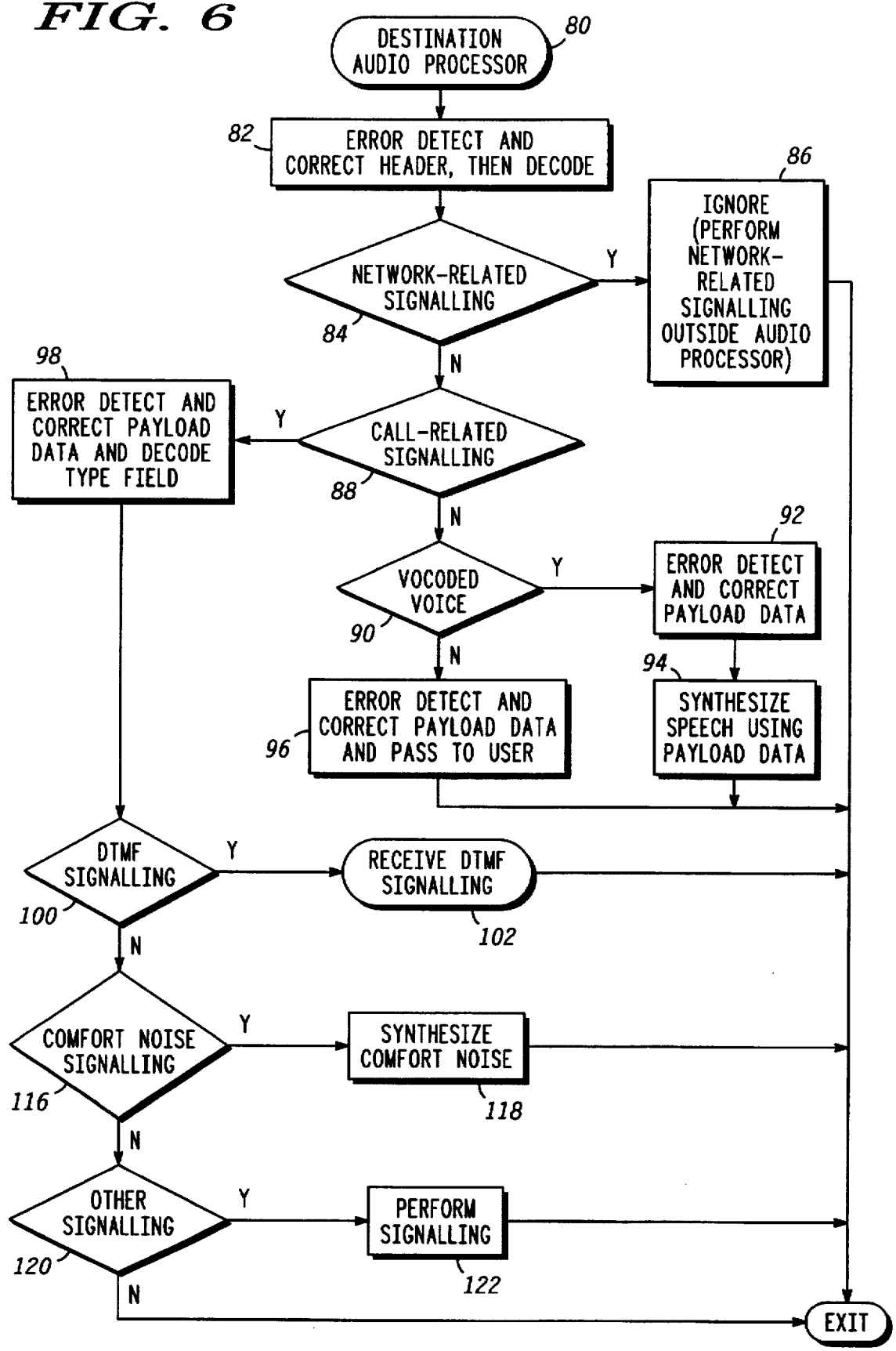
FIG. 6 shows a flow chart of a destination audio processor process.

FIG. 6 shows a flow chart of a destination process 80 of audio processor 56. Destination process 80 is performed by controller 48 and DSP 50 (see FIG. 4) under the control of software programming instructions stored in memory 46 (see FIG. 4) when a packet 26 (see FIGS. 2-3) is received at an external node 14 (see FIG. 1) in network 10 after a call has been setup between that "destination" external node 14 and a "source" external node 14.

Destination process 80 includes a task 82 performed, at least in part, by in-band interface 60 (see FIG. 5). Task 82 performs any error detection and correction activities needed on packet type 32 using EDC bits 34 (see FIGS. 2-3), then decodes the packet type. The packet type may indicate network-related signalling, call-related signalling, user data, or voice data.

After task 82, a query task 84 determines whether the packet 26 conveys network-related signalling. If packet 26 is a network-related signalling packet, then audio processor 56 ignores packet 26, as indicated at a task 86. After task 86, program control exits process 80 to await the arrival of the next packet. Network-related signalling is not acted upon in audio processor 56 because it is performed outside of audio processor 56 at, for example, out-of-band processor 58 (see FIG. 5) or an intermediate node 12 (see FIG. 1). In an alternative embodiment, network-related signalling packets 26 are intercepted and diverted prior to task 82. Consequently tasks 84 and 86 may be omitted.

When task 84 determines that a received packet 26 is not a network-related signalling packet, a query task 88 determines whether the packet 26 is a call-related signalling packet. If the packet 26 is not a call-related signalling packet, then a query task 90 determines whether the packet 26 conveys vocoded voice. When a vocoded voice packet is detected, a task 92 performs any error detection and correction needed on payload data 30 (see FIG. 2), and a task 94 synthesizes speech in response to the payload data. Task 94 is performed by speech synthesizer 62 (see FIG. 5). The present invention contemplates the use of conventional vocoding techniques at task 94. After task 94, program control exits process 80 to await the arrival of the next packet.

When task 90 determines that a received packet 26 does not convey network-related signalling, call-related signalling, or vocoded voice, then it conveys user data in the preferred embodiment. In this situation, a task 96 performs any error detection and correction needed on payload 30 and passes the user data to the user. Of course, those skilled in the art will appreciate that user data need not have any relationship to audio signals. Nevertheless, it is processed by audio processor 56 because the user data are intended for a user and because the user data have been transported through a channel capable of accommodating audio. After task 96, program control exits process 80 to await the arrival of the next packet.

Referring back to task 88, when a call-related signalling packet is encountered, a task 98 performs any error detection and correction needed on payload 30 and then decodes type field 40 (see FIG. 3). Thus, task 98 determines which one of a plurality of possible diverse call-related signalling instructions is being conveyed by this particular call-related signalling packet 26. After task 98, a query task 100 determines whether the packet 26 conveys DTMF signalling instructions. When a DTMF call-related signalling packet 26 is encountered, program control proceeds to a receive DTMF signalling process 102.

Figure 7:
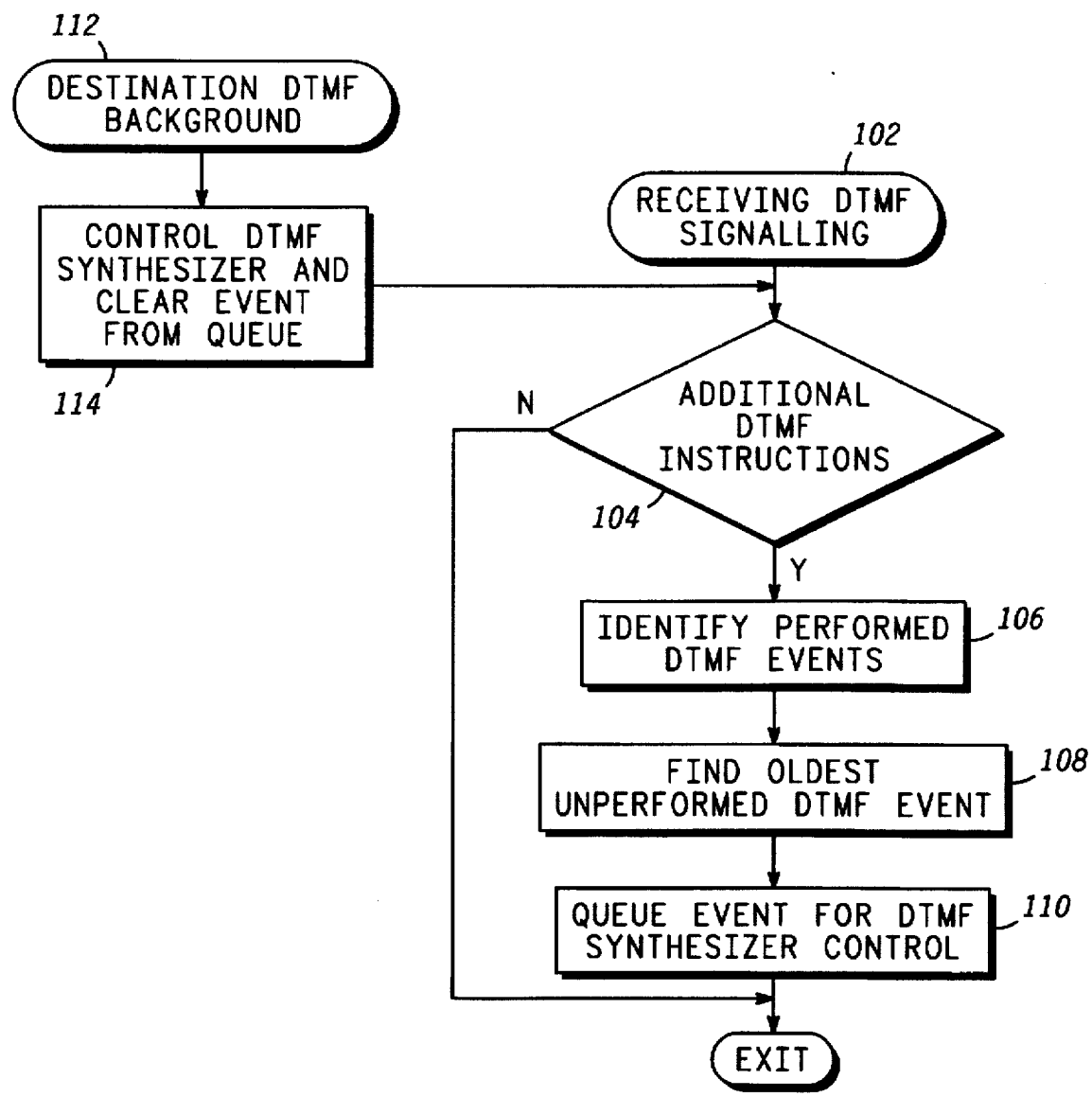
FIG. 7 shows a flow chart of a receive DTMF signalling process.

FIG. 7 shows a flow chart of receive DTMF signalling process 102. In performing process 102, audio processor 56 performs a query task 104. Task 104 determines whether additional DTMF instructions remain to be acted upon. Additional DTMF instructions will remain when task 104 is first performed after receipt of a DTMF call-related signalling packet. However, task 104 will be performed more than once for each DTMF call-related signalling packet, and at a subsequent iteration of task 104 all DTMF instructions conveyed by the DTMF call-related signalling packet will have been acted upon with no additional instructions remaining. At this point, process 102 is complete and program control may exit process 80 to await the arrival of the next packet.

So long as additional DTMF instructions remain in a DTMF call-related signalling packet, a task 106 identifies performed DTMF events. As discussed above in connection with FIG. 3, a DTMF call-related signalling packet conveys a sequence of several DTMF instructions. In all likelihood, many of these instructions have already been performed. Thus, task 106 identifies the already performed DTMF instructions so that audio processor 56 may refrain from repeating these instructions.

Next, a task 108 finds the oldest unperformed DTMF instruction or event, and a task 110 queues this event so that DTMF synthesizer 66 (see FIG. 5) may be controlled at the indicated time. Nothing prevents the event or instruction from being queued for immediate activity. After task 110, program control exits process 80 to await the arrival of the next packet.

A time-driven destination DTMF background process 112 is occasionally performed in a background mode irrespective of a current state for process 80. Process 112 is activated at the times scheduled by queued DTMF events. Such queuing occurs through the operation of task 110. When a time at which a queued DTMF event occurs, a task 114 controls DTMF synthesizer 66 (see FIG. 5) in accordance with the instruction and clears the event from the queue. The control of DTMF synthesizer 66 can lead to the generation of a specified DTMF tone or silence. Conventional digital signal processing techniques are contemplated for the generation of DTMF tones. After task 114, program control proceeds to task 104, discussed above. At this point, the oldest unperformed DTMF event instruction contained in a prior-received DTMF call-related signalling packet will be queued for action at the time indicated by the packet contents. If all DTMF instructions have been acted upon and no additional DTMF instructions remain, no action will be queued.

Processes 102 and 112 cooperate with one another so that DTMF instructions are acted upon quickly. DTMF signals may be generated starting as soon as a DTMF call-related signalling packet is received at a destination node. Thus, it experiences approximately the same delay as vocoded speech. In addition, since audio processor 56 handles only one call, the delay does not vary from instant to instant depending upon the number of calls being handled by a facility which acts upon the DTMF instructions. Moreover, DTMF call-related signalling is reliable because each DTMF call-related signalling packet conveys a sequence of DTMF instructions and related timing data. If DTMF call-related signalling packets get lost or corrupted, their contents are repeated in later occurring packets. A high likelihood exists that remote accessory equipment controlled by DTMF signalling from a destination node will receive DTMF signals in substantially the same sequence and with substantially the same timing as provided to a source node.

Referring back to FIG. 6, when task 100 determines that a call-related signalling packet does not convey DTMF signalling, a query task 116 determines whether the packet conveys comfort noise signalling. If a comfort noise signalling packet has been received, then a task 118 synthesizes comfort noise in accordance with parameters provided by the packet. Task 118 provides comfort noise synthesizer 64 (see FIG. 5). Conventional comfort noise synthesis techniques are contemplated for task 118. Those skilled in the art will appreciate that comfort noise synthesis may have many tasks, processes, routines, and the like in common with speech synthesis, and that tasks 118 and 94 need not be entirely distinct from one another. After task 118, program control exits process 80 to await the arrival of the next packet 26.

When task 116 determines that a call-related signalling packet conveys neither DTMF nor comfort noise signalling, additional tasks, such as a query task 120 and a task 122, may be performed to determine and act upon or perform the conveyed signalling. After acting upon the call-related signalling packet, program control exits process 80 to await the arrival of the next packet. The additional call-related signalling may, for example, convey instructions to generate or synthesize call progress tones, modem tones, canned voice messages, and the like at the destination node. Such signalling may be acted upon quickly and with precise timing results for the reasons discussed above.

Figure 8:
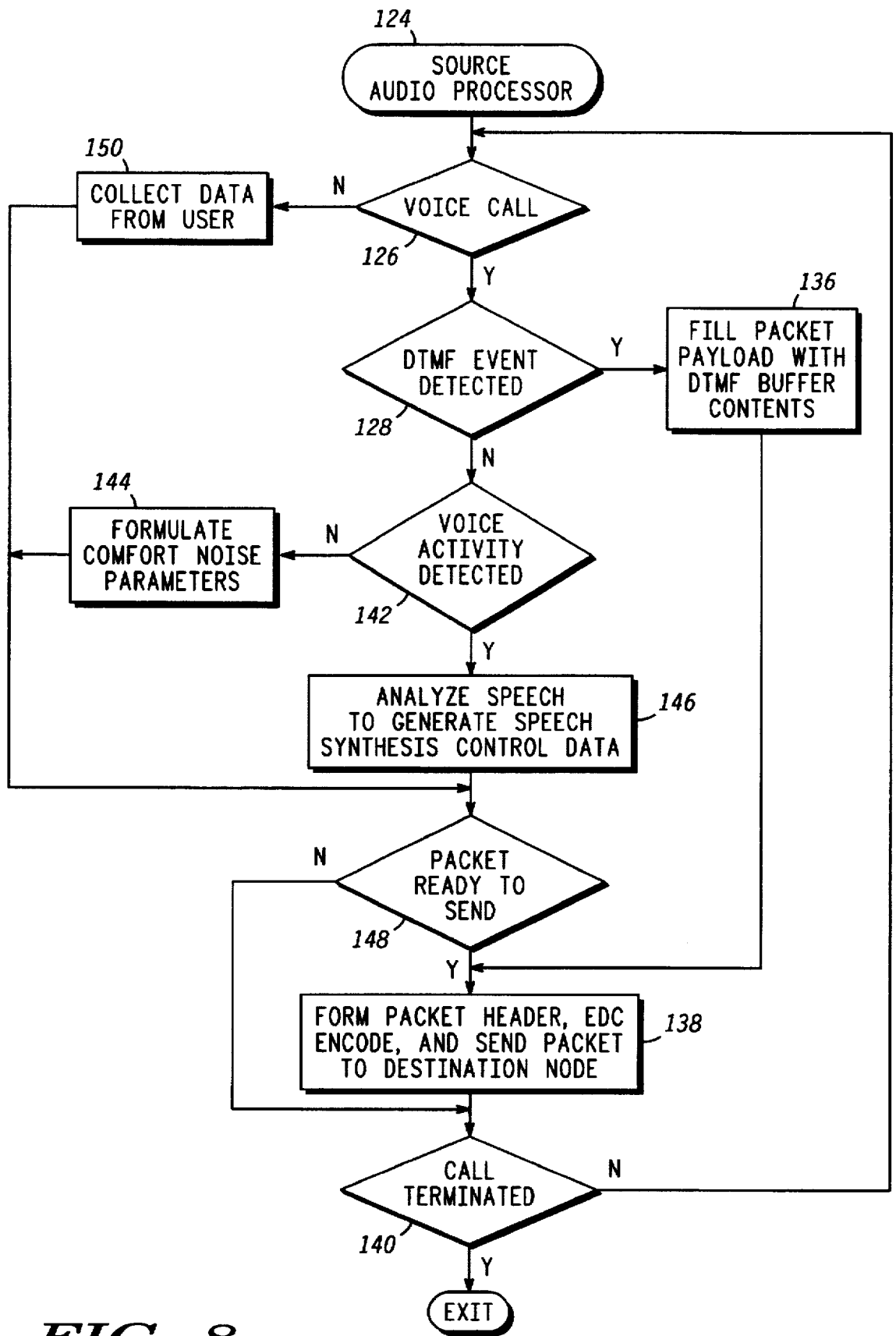
FIG. 8 shows a flow chart of a source audio processor process.

FIG. 8 shows a flow chart of a source process 124 of audio processor 56. Source process 124 is performed by controller 48 and DSP 50 (see FIG. 4) under the control of software programming instructions stored in memory 46 (see FIG. 4) to handle user information provided at a source external node 14 (see FIG. 1) so that it may be communicated to a destination external node 14 during the course of a call. In any external node 14, process 124 may run concurrently with destination process 80, discussed above in connection with FIG. 6. Desirably, a source process 124 at a source external node 14 complements a destination process 80 at a destination external node 14. Source process 124 may be performed after a call has been setup.

Source process 124 includes a query task 126 which determines whether the call has been setup as a voice call or a user data call. In the preferred embodiment, voice and user data types are not combined within the jurisdiction of a single call. However, this is not a requirement of the present invention. If the call has been setup as a voice call, a query task 128 determines whether a DTMF event has been detected. Task 128 may operate in conjunction with a source periodic background process 130, a flow chart of which is presented in FIG. 9.

Referring to FIG. 9, process 130 operates continuously throughout the duration of a call. Thus, process 130 operates concurrently with source process 124 (see FIG. 8). Generally speaking, one iteration of process 130 is performed for each predetermined interval of time. For example, this interval of time may be 180 ms.

Process 130 includes a task 132 which gets and saves a DTMF code. Task 132 implements keystroke detector 74 and/or DTMF decoder 76 (see FIG. 5) of audio processor 56. For keystroke detector 74, task 132 may sample a keypad and return the identity of any key which may be pressed at the instant when task 132 is performed. Switch debouncing and data translation into a standard DTMF code may be included in task 132. For DTMF detector 76, task 132 may sample an analog input line through filters or an FFT process to determine whether a legitimate DTMF signal is present on the analog input line at the instant when task 132 is performed. Of course, one or more DTMF codes may be devised to indicate that no legitimate DTMF signal or keystroke is detected.

Preferably, task 132 saves its sampled DTMF code in a circular DTMF buffer within memory 46 (see FIG. 4). After a circular buffer is first filled with data, new data overwrite the oldest data in the buffer. Thus, the DTMF buffer always includes the most current DTMF user information along with historical DTMF user information for a limited period of time which corresponds to the length of the DTMF buffer. In the preferred embodiment, this limited period of time is around 10 seconds.

After task 132, process 130 may perform any number of other tasks which are not related to DTMF signals. However, before repeating task 132, a wait period will be observed by process 130 until the beginning of the next predetermined interval of time, as indicated at a task 134. When task 132 repeats, user DTMF information is again sampled and saved in the DTMF buffer.

Referring back to FIG. 8, query task 128 may detect a DTMF event by evaluating the DTMF buffer for a change in DTMF user information between the current and previous predetermined intervals of time. If a change is detected, a task 136 fills payload 30 of a packet 26 (see FIG. 3) with the contents of the DTMF buffer. Thus, payload 30 will convey data which will be construed as a sequence of DTMF instructions extending back over the previous 10 seconds.

After task 136, a task 138 is performed to complete the formation of packet 26. Packet formation completion may require the addition of source and destination addresses, packet type, call-related signalling type and other needed information. Task 138 then sends the completed packet 26 into network 10, which has the responsibility for transporting the packet to the destination node. After task 138, a query task 140 determines whether the call has been terminated. So long as the call has not yet terminated, program control loops back to task 126 to continue to analyze, detect, and decode user-provided information. When task 140 eventually determines that the call has terminated, program control exits process 124.

Referring back to task 128, when no DTMF event is detected during the course of a voice call, a query task 142 determines whether voice activity is detected. Task 142 implements voice activity detector 72 (see FIG. 5) using conventional vocoding techniques. When no voice activity is detected (i.e. when the user at the source node is silent), a task 144 formulates comfort noise parameters. Task 144 uses conventional techniques to characterize the background noise.

When task 142 detects voice activity, a task 146 analyzes user-provided speech obtained at I/O section 54 (see FIG. 4) from a microphone or an interface to PSTN 20 (see FIG. 1) or the like, to generate speech synthesis control data. Task 146 forms speech analyzer 70 (see FIG. 5) using conventional vocoding techniques. After either of tasks 144 or 146, a query task 148 determines whether a packet 26 is ready to send. A packet 26 may not be ready to send to the destination node when sufficient data have not yet been generated to fill the packet. For example, comfort noise parameters need to be updated only rarely. When a packet is not yet ready to send, program control proceeds to task 140 to test for call termination then continues processing user-provided information. When a packet is ready to send, program control proceeds to task 138 to complete packet formulation and to send the packet 26 to the destination node before testing for call termination.

Referring back to task 126, when a call has been setup as a user data call, a task 150 collects user data from user I/O section 54 (see FIG. 4), and program control loops through task 148 to send packets as they become ready. Of course, the user data collected at task 150 need not have any relationship to audio signals. Nevertheless, such user data are collected by audio processor 56 because the user data originate from a user and because the user data will be transported through a channel capable of accommodating audio.

While FIG. 8 illustrates a variety of user-provided information which can be handled by audio processor 56 to originate packets, FIG. 8 does not exhaust all possibilities. For example, source audio process 124 may additionally include voice recognition tasks which drive other tasks that configure call-related signalling packets to describe the recognized voice. Likewise, process 124 may additionally include modem tone recognition tasks which convert modem tones into raw user data. Furthermore, tasks may be included at either an external node 14 or an intermediate node 12 to generate call-related signalling packets upon the detection of certain network conditions, such as situations which warrant the generation of call progress tones.

FIG. 10 shows a flow chart of a receive packet at intermediate node process 152. Process 152 is performed at an intermediate node 12 to handle each packet 26 received at the intermediate node 12. Process 152 includes a query task 154 which determines whether the packet 26 conveys network-related signalling. So long as no network-related signalling is detected, a task 156 relays or sends the packet 26 onward within network 10 toward the destination for the packet 26. After task 156, program control exits process 152 but repeats process 152 for the next received packet.

When task 154 encounters a network-related signalling packet 26, a query task 158 is performed. Task 158 determines whether the network-related signalling is to be performed at the intermediate node 12 where process 152 is being performed. If the network-related signalling is to be performed at this node 12, then a task 160 performs such network-related signalling. If the network-related signalling is to be performed at another node of network 10, such as a gateway, then a task 162 is performed to send the packet 26 onward toward that node. After tasks 160 or 162, program control exits process 152 but repeats process 152 for the next received packet 26. Those skilled in the art will appreciate that process 152 may be performed to support any number of concurrently occurring calls.

In an alternate embodiment, network-related signalling destination addresses in packets 26 are configured where originated to identify the proper nodes where network-related signalling is to be performed. Thus, in this embodiment process 152 either relays packets 26 onward toward the packet destinations or performs network-related signalling activities in response to packets 26 having the intermediate node 12 as their destination.

In summary, the present invention provides an improved method and apparatus for conveying audio signals. A signalling scheme is defined which represents a hybrid of out-of-band signalling and in-band signalling. An audio processor module is provided at external nodes of a digital telecommunication network so that each end of each call has its own audio processor. The audio processor accommodates vocoding, the accurate and timely recreation of DTMF signals, and a reliable technique for communicating DTMF, comfort noise and other call-related signalling.

The present invention has been described above with reference to preferred embodiments. However, those skilled in the art will recognize that changes and modifications may be made in these preferred embodiments without departing from the scope of the present invention. For example, those skilled in the art can devise task definitions and task sequencing which differ from those described above and yet accomplish equivalent results. These and other changes and modifications which are obvious to those skilled in the art are intended to be included within the scope of the present invention.

What is claimed is:

1. A method for digitally conveying audio signals through a telecommunication network using digital packets, said method comprising the steps of:

evaluating a first portion of a packet at an audio processor to detect a call-related signalling event;

synthesizing said call-related signalling event at said audio processor when said call-related signalling event is detected, said call-related signalling synthesis occurring in response to data conveyed by a second portion of said packet; and performing speech synthesis at said audio processor when said call-related signalling is not detected, said speech synthesis occurring in response to data conveyed by said second portion of said packet.

2. A method as claimed in claim 1 additionally comprising, when said call-related signalling event is detected, the step of evaluating said second portion of said packet to identify which one of a plurality of diverse call-related signalling instructions is being conveyed.

3. A method as claimed in claim 1 additionally comprising the step of locating said audio processor at a destination node for said packet within said telecommunications network.

4. A method as claimed in claim 3 additionally comprising the steps of:

analyzing speech at said audio processor to generate synthesis control data for a second packet, said analyzing step occurring at said node where said audio processor resides; and detecting a call-related signalling event at said audio processor to generate synthesis control data for a third packet.

5. A method as claimed in claim 1 additionally comprising the steps of:

evaluating said first portion of said packet to identify a network-related signalling event; and performing said network-related signalling event in a network resource other than said audio processor.

6. A method as claimed in claim 1 wherein:

said first portion of said packet includes communication data covered by first error detection and correction data; and said second portion of said packet includes communication data covered by second error detection and correction data such that said first portion has a higher ratio of error detection and correction data to communication data than said second portion.

7. A method as claimed in claim 1 wherein said first portion of said packet evaluated in said evaluating step has fewer bits than said second portion of said packet to which said synthesizing and performing steps are responsive.

8. A method as claimed in claim 1 wherein said call-related signalling event comprises an instruction to generate a dual tone multi frequency (DTMF) signal.

9. A method as claimed in claim 1 wherein said call-related signalling event comprises instructions to generate a sequence of dual tone multi frequency (DTMF) signals, each signal having a duration associated therewith.

10. A method as claimed in claim 1 wherein said call-related signalling event includes instructions to generate modem tones, canned voice messages and call progress tones.

11. A method as claimed in claim 1 wherein:

said call-related signalling event comprises instructions to generate a sequence of dual tone multi frequency (DTMF) signals;

said synthesizing step comprises the step of identifying ones of said signals which have already been synthesized; and said synthesizing step further comprises the step of refraining from synthesizing said ones of said signals.

12. A method as claimed in claim 1 wherein said call-related signalling event includes an instruction to generate comfort noise.

13. A method for digitally conveying audio signals through a telecommunication network using digital packets, said method comprising the steps of:

locating an audio processor at a destination node in said network for a digital packet;

evaluating a first portion of said packet at said audio processor to detect an instruction to generate a dual tone multi frequency (DTMF) signal;

generating said DTMF signal at said audio processor when said instruction is detected, said signal being generated in response to control data conveyed by a second portion of said packet; and performing speech synthesis at said audio processor when said instruction is not detected, said speech synthesis occurring in response to data conveyed by said second portion of said packet.

14. A method as claimed in claim 13 additionally comprising the steps of:

analyzing speech at said audio processor to generate synthesis control data for a second packet having said node where said audio processor resides as a source; and detecting a call-related signalling event at said audio processor to generate synthesis control data for a third packet having said node where said audio processor resides as a source.

15. A method as claimed in claim 13 wherein:

said first portion of said packet includes communication data covered by first error detection and correction data; and said second portion of said packet includes communication data covered by second error detection and correction data such that said first portion has a higher ratio of error detection and correction data to communication data than said second portion.

16. A method as claimed in claim 13 wherein:

said packet includes instructions to generate a sequence of dual tone multi frequency (DTMF) signals; and said generating step comprises the step of generating only a portion of said signals.

17. A method as claimed in claim 13 wherein:

said packet includes timing data which define a duration over which to generate said DTMF signal; and said generating step comprises the step of generating said DTMF signal for said duration.

18. A method as claimed in claim 13 wherein:

said packet includes instructions to generate a sequence of dual tone multi frequency (DTMF) signals;

said generating step comprises the step of identifying ones of said signals which have already been synthesized; and said generating step further comprises the step of refraining from synthesizing said ones of said signals.

19. A telecommunication network that conveys audio signals using digital packets, the telecommunication network comprising:

a detector for evaluating a first portion of said packets to detect call-related signaling events, a synthesizer for synthesizing said call-related signaling events in response to data conveyed by a second portion of said packets when said call-related signaling events are detected; and a speech synthesizer for performing speech synthesis in response to data conveyed by said second portion of said packet when said call-related signaling events are not detected.

20. A telecommunication network as claimed in claim 19 wherein said data packets are originated at a source node, and wherein said source node comprises an audio processor configured to analyze speech for generating synthesis control data for a first portion of said packets and to detect call-related signaling events for generating synthesis control data for a second portion of said packets.

21. A telecommunication network as claimed in claim 19 wherein said data packets are relayed by an intermediate node, and wherein said intermediate node is configured to evaluate said first portion of said packets to identify a network-related signaling event and to perform said network-related signaling event.

22. A telecommunication network as claimed in claim 19 wherein one of said packets is configured to specify a call-related signalling event which comprises an instruction to generate a dual tone multi frequency (DTMF) signal.

23. A telecommunication network as claimed in claim 19 wherein one of said packets is configured to specify a call-related signalling event which includes an instruction to generate modem tones, canned voice messages and call progress tones.

24. A telecommunication network as claimed in claim 19 wherein one of said packets is configured to specify a call-related signalling event which comprises instructions to generate a sequence of dual tone multi frequency (DTMF) signals, with each signal having a duration associated therewith.

25. A telecommunication network as claimed in claim 19 wherein:

one of said packets is configured to specify a call-related signaling event which comprises instructions to generate a sequence of dual tone multi frequency (DTMF) signals;

said detector is configured to identify ones of said signals which have already been synthesized; and said synthesizer is further configured to refrain from synthesizing said ones of said signals.

* * * * *